(12) United States Patent
Al-Dweik et al.

(10) Patent No.: US 10,484,226 B2
(45) Date of Patent: Nov. 19, 2019

(54) OFDM COMMUNICATION SYSTEM WITH ENHANCED CHANNEL ESTIMATION AND DATA DETECTION TECHNIQUES

(71) Applicant: Khalifa University of Science, Technology & Research, Abu Dhabi (AE)

(72) Inventors: Arafat Jamil Al-Dweik, Abu Dhabi (AE); Youssef Iraqi, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 303 days.

(21) Appl. No.: 15/375,857

(22) Filed: Dec. 12, 2016

(65) Prior Publication Data

US 2018/0167175 A1    Jun. 14, 2018

(51) Int. Cl.
*H04L 27/26* (2006.01)
*H04L 25/02* (2006.01)
*H04L 27/00* (2006.01)

(52) U.S. Cl.
CPC .......... *H04L 27/2647* (2013.01); *H04L 25/02* (2013.01); *H04L 25/022* (2013.01); *H04L 25/0232* (2013.01); *H04L 27/0008* (2013.01)

(58) Field of Classification Search
CPC ............. H04L 27/2647; H04L 25/0232; H04L 25/022; H04L 25/02; H04L 27/0008
See application file for complete search history.

(56) References Cited

U.S. PATENT DOCUMENTS

| | | | | |
|---|---|---|---|---|
| 9,094,107 B1* | 7/2015 | Kumar | .................. | H04L 27/103 |
| 2002/0181390 A1* | 12/2002 | Mody | ....................... | H04L 1/06 |
| | | | | 370/208 |
| 2005/0128935 A1* | 6/2005 | Tang | .................... | H04L 1/0003 |
| | | | | 370/208 |
| 2013/0121392 A1* | 5/2013 | Thompson | .......... | H04L 25/0212 |
| | | | | 375/227 |
| 2013/0202055 A1* | 8/2013 | Caliguri | .............. | H04L 27/2647 |
| | | | | 375/260 |
| 2014/0241232 A1* | 8/2014 | Damji | ................. | H04L 25/0204 |
| | | | | 370/312 |
| 2014/0362934 A1* | 12/2014 | Kumar | ................ | H04L 27/2602 |
| | | | | 375/260 |

* cited by examiner

*Primary Examiner* — Ivan O Latorre
(74) *Attorney, Agent, or Firm* — Hayes Soloway PC

(57) ABSTRACT

There is provided an enhanced OFDM communication system using an enhanced channel estimation and data detection techniques. The system is based on replacing pilot symbols by real-valued information symbols, which enables realizing one-shot blind channel estimator (OSBCE) with low complexity. The channel estimator used is equivalent to pilot-based channel estimators for a wide range of signal to noise ratios (SNRs), yet, the OSBCE offers higher power and spectral efficiencies.

17 Claims, 11 Drawing Sheets

-- PRIOR ART --

… (US 10,484,226 B2)

OFDM COMMUNICATION SYSTEM WITH ENHANCED CHANNEL ESTIMATION AND DATA DETECTION TECHNIQUES

FIELD OF THE INVENTION

The present invention generally relates to orthogonal frequency division multiplexing (OFDM) communication systems and to channel estimators used in OFDM communication systems.

BACKGROUND OF THE INVENTION

Orthogonal frequency division multiplexing (OFDM) is a multicarrier modulation technique that employs orthogonal subcarriers. OFDM systems can be implemented efficiently by means of inverse fast Fourier transform (IFFT) and fast Fourier transform (FFT) at the transmitter and receiver, respectively. Bandwidth efficiency and immunity to multipath propagation are the main advantages of OFDM over single carrier transmission [1]. Consequently, OFDM has been adopted in many wireless digital communication standards such as digital video broadcasting-terrestrial (DVB-T) [2], Interoperability for Microwave Access (WiMAX) technologies [3], the Long Term Evolution LTE-Advanced (LTE-A) [4]. For wired systems, OFDM has been adopted for broadband communications over powerline communications [5]. Moreover, OFDM is a strong candidate for the upcoming fifth generation (5G) wireless communications standard [6].

The knowledge of the channel state information (CSI), commonly known as channel estimation, and equalization are fundamental tasks that a receiver has to perform prior to the information symbols extraction from the received signal. The accuracy of the CSI is one of the key factors that determine the error performance of communications systems [7]. Consequently, channel estimation has to be performed meticulously to avoid increasing the system error rate. Consequently, channel estimation for OFDM has attracted remarkable attention in the literature. Generally speaking, the channel estimation techniques reported in the literature can be classified based on their accuracy, spectral efficiency, computational complexity, or observation window size. Typically, the objective in most of the work reported in the literature is to maximize the accuracy and spectral efficiency, while minimizing the complexity and observation window size. However, these are conflicting objectives and hence, it is difficult to achieve all of them simultaneously.

Based on their spectral efficiency, channel estimation techniques are typically classified as blind [8]-[13], or pilot-aided [14]-[18]. However, such classification can be misleading in various scenarios. For example, certain channel estimation algorithms are considered as blind while they have constraints on the modulation type [8]-[11], and hence, their spectral efficiency could actually be worse than pilot-aided techniques under bit error rate (BER) and data rate constraints. Therefore, an accurate and more informative metric is needed to evaluate and compare the spectral efficiency of various channel estimation algorithms. Moreover, it would be more factual to denote modulation-type constrained blind techniques as conditionally-blind. In practical OFDM systems such as LTE-A [4], comb-type pilots are deployed in the time-frequency subcarrier grid as shown in FIG. 1. Such structure implies that 4.7% of the system bandwidth is wasted for pilots. The bandwidth efficiency can be even lower for some other systems such as the IEEE 802.11n where pilot symbols constitutes 7.1% of the system bandwidth. Moreover, in particular communications systems such burst transmission, frequency hopping and cognitive radio, the channel responses over two consecutive OFDM symbols could be uncorrelated, and hence, pilot symbols are needed in every OFDM symbol which would degrade the spectrum efficiency drastically.

Computational complexity is another major metric used to compare various channel estimation techniques. Generally speaking, blind estimation techniques have higher computational complexity [13] than pilot-aided techniques [7]. The excessive computational complexity is mainly caused by the iterative structure of the algorithm [13]-[15], or due to the requirements of performing extensive search over the solution space [12]. Although the complexity of the system reported in [12] becomes comparable to pilot-aided estimation at high signal-to-noise ratios (SNR), such condition can be frequently violated in practical scenarios. It is worth noting that there is no unified threshold that can be used to classify channel estimation algorithms based on their complexity. Nevertheless, low computational complexity is typically claimed when the total number of mathematical operations is a linear function of the system and channel parameters [12]. Alternatively, low complexity is claimed when a particular system computational complexity is low compared to other well established estimators [17], [18].

The observation window size specifies the number of symbols required to obtain the CSI. In such systems, the channel is assumed to be fixed over the observation period [8], [9], [11], [13]. While such assumption might be suitable for static and slow fading channels, definitely it will not be the case in mobile channels. Moreover, if the observation window size is large, such assumption becomes suitable only for static channels. Channel estimators that can perform the CSI within one OFDM period, denoted as one-shot estimators, may usually provide better performance as compared to other estimators with multiple-symbols observation window [12].

As it can be noted from the aforementioned discussion, pilot-aided estimators have several desired features in terms of complexity and estimation accuracy. However, the spectral efficiency remains as the major concern. Practically speaking, prominent standards such as DVB-T [2], [3] WiMAX and LTE-A [4] are using pilot symbols, which implies that systems' designers prefer to sacrifice the spectral efficiency for other desired features such as low complexity, robustness and freedom of choosing the modulation type. Despite the large number of articles that tackle the channel estimation problem, to the best of our knowledge, there is no technique available yet that offers all the aforementioned desired features simultaneously.

SUMMARY OF THE INVENTION

As a first aspect of the present invention, there is provided a channel estimation device in an Orthogonal Frequency Division Multiplexing (OFDM) system comprising an OFDM transmitter and an OFDM receiver adapted to communicate data symbols over a communication channel having channel conditions, the channel estimation device being adapted to:
   at the OFDM transmitter side, modulate the OFDM subcarriers by the data symbols in frequency domain using different modulation techniques for generating modulated data symbols having a diversified symbol type configuration, the different modulation techniques comprising a first modulation technique, a second modulation technique and a third modulation technique, the modulated data symbols having the diversified symbol type configuration being generated by modulating first OFDM subcarrier using the first modulation technique for generating first type symbols, modulating second OFDM subcarriers adjacent the first OFDM subcarriers in the frequency domain using the second modulation technique for generating second type symbols and modulating third OFDM subcarriers using the third modulation technique for generating third type symbols; and at the OFDM receiver side, consider the first type symbols as first channel response and to process said first channel response for detecting the second type symbols and to consider the second type symbols as second channel responses and to process said first and second channel response for detecting the third type symbols.

In an embodiment of the invention, the first, second and third type symbols generated by the channel estimation device are data-bearing symbols only.

In an embodiment of the invention, the first, second and third type symbols are free of any pilot (reference) symbols.

In an embodiment of the invention, the different modulation techniques comprise MPSK, MASK and QAM.

In an embodiment of the invention, the first modulation technique is MASK, the second modulation technique is MPSK and the third modulation technique is QAM.

In an embodiment of the invention, the data symbols are modulated to form a plurality of symbol blocks and wherein each symbol block among said plurality of symbol blocks is generated according to the diversified symbol type configuration.

In an embodiment of the invention, each symbol block comprises at least two pairs of adjacently formed first and second type symbols such that each pair of adjacently formed first and second type symbols is separated from another pair of adjacently formed first and second type symbols by a frequency spacing using third type symbols.

In an embodiment of the invention, the channel estimation device is adapted to adjust the frequency spacing as a function of the channel conditions.

In an embodiment of the invention, the symbol blocks are separated between each other by a time spacing using third type symbols.

In an embodiment of the invention, the channel estimation device is adapted to adjust the time spacing as a function of the channel conditions.

In an embodiment of the invention, the OFDM system is a Long Term Evolution LTE-Advanced (LTE-A) system.

In an embodiment of the invention, the communication channel is a fading channel. Preferably, the fading channel is a flat and static fading channel but can also be frequency-selective and time varying channel.

In an embodiment of the invention, the communication is a broadband communication.

In an embodiment of the invention, the device uses a Least Squared estimation (LSE) in Decision-Directed (DD) manner.

As a further aspect of the invention, there is provided an Orthogonal Frequency Division Multiplexing (OFDM) system for broadband communication of data symbols over a communication channel having channel conditions, the OFDM system comprising:

an OFDM transmitter adapted to modulate the data symbols by OFDM subcarriers in a frequency domain using different modulation techniques for generating modulated data symbols having a diversified symbol type configuration, the different modulation techniques comprising a first modulation technique, a second modulation technique and a third modulation technique, the modulated data symbols having the diversified symbol type configuration being generated by modulating first OFDM subcarriers using the first modulation technique for generating first type symbols, modulating second OFDM subcarriers adjacent the first OFDM subcarriers in the frequency domain using the second modulation technique for generating second type symbols and modulating third OFDM subcarriers using the third modulation technique for generating third type symbols; and an OFDM receiver adapted to process the first type symbols as first channel responses and to process said first channel responses for detecting the second type symbols and to process the second type symbols as second channel responses and to process said first and second channel responses for detecting the third type symbols.

In an embodiment of the invention, the first, second and third type symbols generated by the channel estimation device are data-bearing symbols only and they are preferably free of any pilot symbols.

In an embodiment of the invention, the different modulation techniques comprise MPSK, MASK and QAM, and preferably, the first modulation technique is MASK, the second modulation technique is MPSK and the third modulation technique is QAM.

In an embodiment of the invention, the data symbols are modulated to form a plurality of symbol blocks and wherein each symbol block among said plurality of symbol blocks is generated according to the diversified symbol type configuration, and wherein each symbol block comprises at least two pairs of adjacently formed first and second type symbols such that each pair of adjacently formed first and second type symbols is separated from another pair of adjacently formed first and second type symbols by a frequency spacing using third type symbols.

In an embodiment of the invention, the symbol blocks are separated between each other by a time spacing using third type symbols.

In an embodiment of the invention, the OFDM system is adapted to adjust the frequency spacing and the time spacing as a function of the channel conditions.

In an embodiment of the invention, the OFDM system uses a Long Term Evolution LTE-Advanced (LTE-A) system.

In an embodiment of the invention, the communication channel is a fading channel.

In an embodiment of the invention, the OFDM receiver uses a Least Squared estimation (LSE) in Decision-Directed (DD) manner.

In an embodiment of the invention, the OFDM system has a similar complexity of a LTE-A system, a spectral efficiency similar to an equivalent system using a blind estimation with a better BER performance.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Introduction

Figure 1:
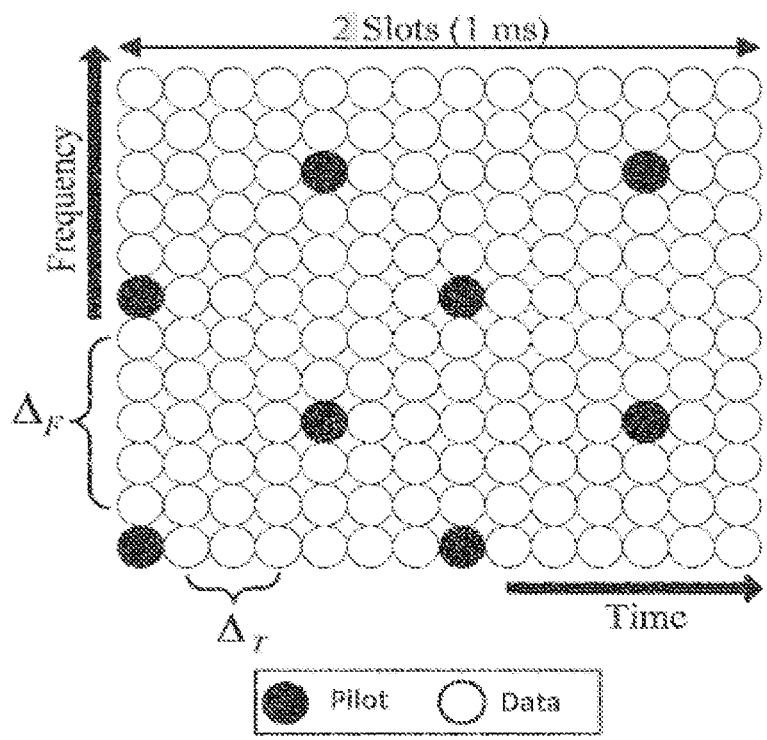
FIG. 1 illustrates a Long Term Evolution (LTE) pilot grid map (Prior Art).

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

As an aspect of the invention, there is provided a novel channel estimation technique which is conditionally-blind, has high spectral efficiency and one-shot estimation process. In the proposed scheme, the pilot symbols are replaced with a data-bearing symbols, which are designed to enable estimating the CSI with negligible impact on the spectral efficiency. Similar to conventional pilot-based OFDM systems, the proposed system uses least square estimation (LSE) as well, however the obtained channel coefficients are obtained in a decision directed fashion to spare using pilots.

In what follows unless otherwise specified, uppercase boldface and blackboard letters such as H and $\mathbb{H}$ will denote N×N matrices, whereas lowercase boldface letters such as x will denote row or column vectors with N elements. Symbols and letters with a Hacek such as ď will denote initial estimate of d while letters with a Hat such as d̂ will denote the final estimate of d. The complex conjugate, transpose and Hermetian transpose will be denoted as $(\bullet)^*$, $(\bullet)^T$ and $(\bullet)^H$, respectively. The expected value is denoted by E {.}.

OFDM System Model

Consider an OFDM system with N subcarriers modulated by a sequence of N complex data symbols $d=[d_0, d_1, \ldots, d_{N-1}]^T$. The data symbols are selected uniformly from a general constellation such as M-ary phase shift keying (MPSK) or quadrature amplitude modulation (QAM). The modulation process can be implemented efficiently using N-points IFFT. The output of the IFFT process during the $\ell$ th OFDM block is given by, $$x(\ell)=F^H d(\ell), \tag{1}$$

where F is the normalized N×N FFT matrix and $(\bullet)^H$ denotes the Hermitian transpose, and hence, $F^H$ is the inverse FFT (IFFT) matrix. The elements of $F^H$ are defined as $F_{i,k}=(1/\sqrt{N})e^{j2\pi ik/N}$ where i and k denote the row and column numbers [i, k] ∈ {0, 1, ..., N−1}, respectively. To eliminate the inter-symbol-interference (ISI) between consecutive OFDM symbols and maintain the subcarriers' orthogonality in frequency selective multipath fading channels, a cyclic prefix (CP) of length $N_{cp}$ samples no less than the channel maximum delay spread ($\mathcal{D}$) is formed by copying the last $N_{cp}$ samples of x and appending them in front of the IFFT output to compose the OFDM symbol with a total length $N_t=N+N_{cp}$ samples and a duration of $T_t$ seconds. Then, the complex baseband OFDM symbol during the $\ell$ th signaling period $\tilde{x}(\ell)$ is upsampled, filtered and up-converted to a radio frequency centered at $f_c$ before transmission through the antenna.

At the front-end of the uth receiving branch, u∈{1, 2, ..., U}, the received signal is down-converted to baseband and sampled at a rate $T_s=T_t/N_t$. In this work we assume that the channel is composed of $\mathcal{D}$+1 independent multipath components each of which has a gain $h_m$ and delay $m\times T_s$, where m∈{0, 1, ..., D}. The channel taps are assumed to be constant over one OFDM symbol, but they may change over two consecutive symbols, which corresponds to a quasi static multipath channel [19]. The received sequence consists of $N_t$ samples, and it can be expressed as $$\tilde{y}^u(\ell)=\mathbb{H}^u(\ell)\tilde{x}(\ell)+\tilde{z}^u(\ell)$$

where the channel matrix $\mathbb{H}$ is an $N_t \times N_t$ Toeplitz matrix with $h_0$ on the principal diagonal and $h_1, \ldots, h_D$ on the minor diagonals, respectively, the noise vector ž is modeled as a white Gaussian noise process with zero mean and variance $\sigma_z^2=E[|z_n|^2]$. The received non CP samples that belong to a single OFDM symbol can be expressed as $$y_n^u(\ell) = \sum_{m=0}^{\mathcal{D}} h_m^u(\ell) x_{(n-m)_N}(\ell) + z_n^u(\ell). \tag{2}$$

Subsequently, the receiver should discard the $N_{cp}$ CP samples, and then compute the FFT of y, where y=$\mathbb{H}$x+z, the channel matrix $\mathbb{H}$ is an N×N circulant matrix, and z~$\mathcal{CN}(0_N, 2\sigma_z^2 I_N)$ is the AWGN vector, $I_N$ is the N×N identity matrix. In what follows, the time and space indices $\ell$ and u will be dropped unless it is necessary to include them. Therefore, the FFT output can be computed as $$r = Fy = F\mathbb{H}F^H d + Fz. \tag{3}$$

Because the matrix $\mathbb{H}$ is circulant, it will be diagonalized by the FFT and IFFT matrices. Hence, $$r = Hd + w \quad (4)$$

where $r \in \mathbb{C}^{N \times 1}$ and $w \sim \mathcal{CN}(0_N, 2\sigma_z^2 I_N)$ is the FFT of the noise vector z, H denotes the channel frequency response $$H = \text{diag}([H_0, H_1, \ldots, H_{N-1}]) \quad (5)$$

and $H_k = \sum_{m=0}^{D} h_m e^{-j2\pi mk/N}$ represents the channel response in frequency domain.

The elements of the received vectors from the U antennas are then combined and fed to a maximum likelihood detector (MLD). Assuming that maximum ratio combining (MRC) is used, the estimated kth symbol can be expressed as $$\hat{d}_k = \underset{\tilde{d}_k}{\text{argmin}} \left| \hat{g}_k^* r_k - \tilde{d}_k \right|^2, k = [0, \ldots, N-1] \quad (6)$$

where $\tilde{d}_k$ is the trial values of the transmitted data symbol at the kth subcarrier and the received signals vector $r_k = [r_k^1, r_k^2, \ldots, r_k^U]^T$. For MRC, the weighting factors of the U branches are expressed as $$\hat{g}_k = \frac{1}{\|\hat{H}\|^2} [\hat{H}_k^1, \hat{H}_k^2, \ldots, \hat{H}_k^U],$$

$\|\cdot\|$ denotes the Euclidean norm. It is worth noting that for U=1, the MLD detector described in (6) reduces to a single-tap zero-forcing (ZF) equalizer [20].

In practical systems such as LTE-A, the data symbols are arranged in a time-frequency grid given in FIG. 1. The channel estimation based on such structure is typically performed over two steps. First, initial channel estimates are obtained at the position of the pilot symbols using least square estimation (LSE). Assuming that a given pilot has an index k, then $$\check{H}_k = \frac{r_k}{d_k} \quad (7)$$

where $d_k$ denotes the pilot symbol value, which is assumed to be known at the receiver side. By noting that $r_k^u = H_k^u d_k + w_k^u$, the channel estimates can be written as $$\check{H}_k = H_k + q_k \quad (8)$$

where $H_k \sim \mathcal{CN}(0_U, 2\sigma_H^2 I_U)$ and $q_k | d_k \sim \mathcal{CN}$ $$\left( 0_U, \frac{2\sigma_z^2}{|d_k|^2} I_U \right),$$

where the variance of $q_k$ is conditioned on the symbol pilot symbol value. Once the initial CSI is obtained at all pilots' positions, the set $\check{H}^u$ can be obtained as well. Towards this goal, various techniques can be invoked such as linear interpolation [7], parametric estimation [16], or least-square-fitting [22]. It is worth noting that when linear interpolation is used, the initial channel estimates at the pilots' positions $\check{H}_k$ will be replaced by the new estimates obtained from the fitting polynomial, consequently $\hat{H}_k \neq \check{H}_k$ [22].

Once the channel estimates are obtained for the all OFDM symbol that has pilots within the resource block, interpolation in time domain can be used to find the channel estimates for OFDM symbols without pilots. Although such process is not optimal, it has low complexity as compared to the two-dimensional interpolation [7].

The Proposed System

A. Proposed Transmitter

Figure 2:
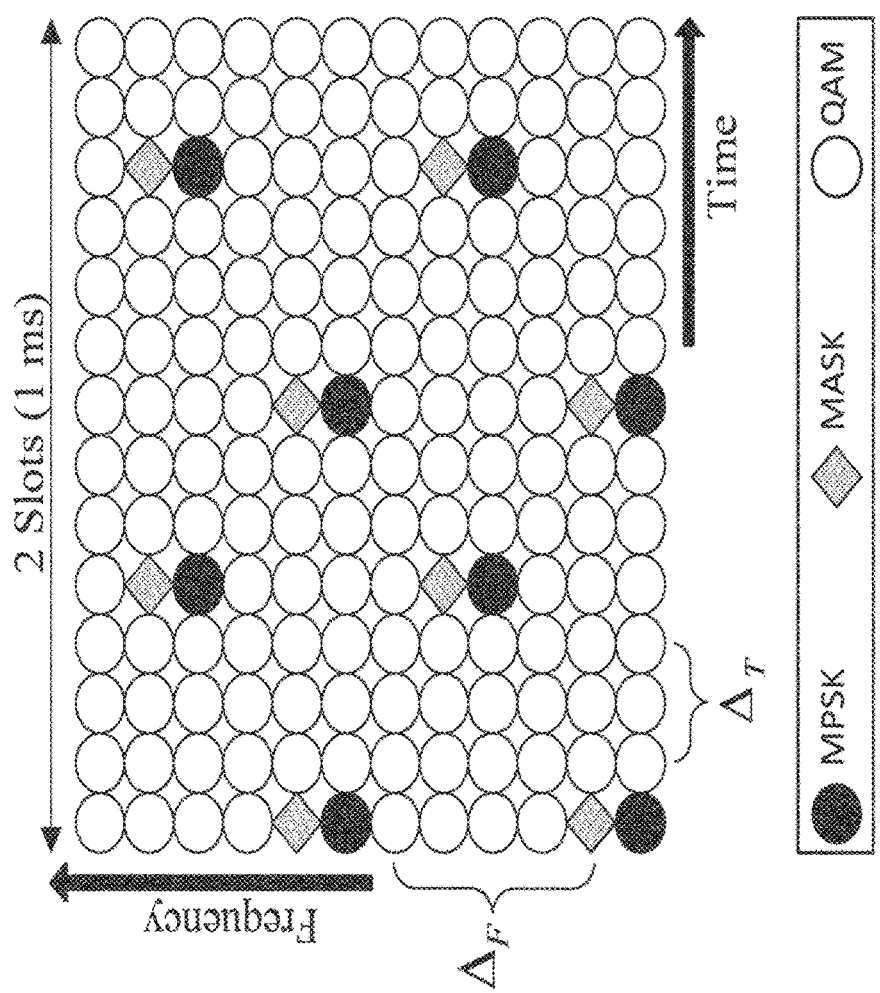
FIG. 2 illustrates a proposed hybrid frame with a diversified symbol type configuration according to an embodiment of the invention.

The proposed transmitter is generally similar to conventional OFDM transmitter except that a new frame structure composed of three different modulation types, namely, QAM, MASK and MPSK as shown in FIG. 2. In the new structure, the pilot symbols are replaced by data symbols modulated using MPSK, the subcarriers adjacent to the MPSK symbols are modulated using MASK, and the remaining subcarriers are modulated using QAM. Although we chose to apply the proposed system to LTE-A, it can be applied to any system that uses OFDM. Moreover, the frequency spacing $\Delta_F$ and time spacing $\Delta_T$ can be changed based on the system and channel conditions.

Figure 3:
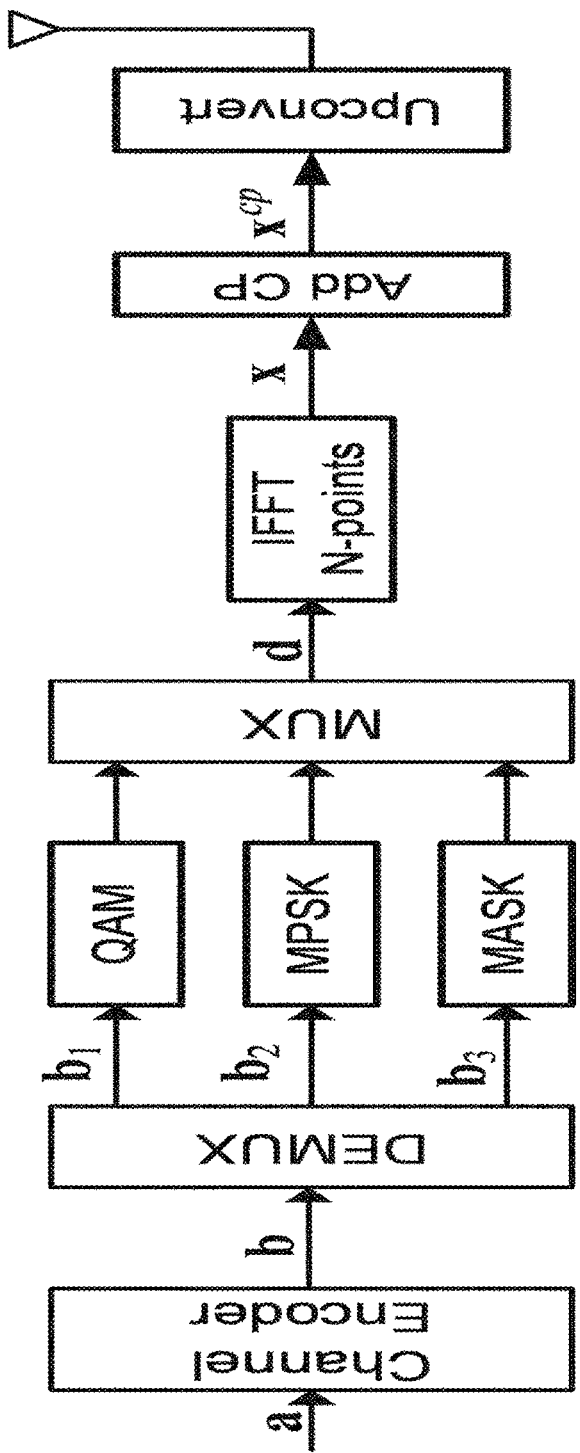
FIG. 3 illustrates a block diagram of an OFDM transmitter according to an embodiment of the invention.

FIG. 3 shows the system-level block diagram where the information bits are applied to a channel encoder, which is an optional function. Then, the encoded bits are split into three parallel streams each of which is modulated using the corresponding modulation scheme. The three types of symbols are combined to form one block, and the rest of the process is similar to conventional OFDM transmission.

B. Proposed Receiver

One of the main features of OFDM systems is that adjacent channel frequency responses are highly correlated. After dropping the time index $\ell$ and antenna index u for notational simplicity, the correlation coefficient $E\{H_k H_{k+1}^*\} \triangleq \rho$ can be expressed as $$\rho = E \left\{ \sum_{n=0}^{D} \sum_{m=0}^{D} h_n h_m^* e^{j2\pi \frac{-(n-m)k+n}{N}} \right\}. \quad (9)$$

Given that $h_k \forall_k$ are independent and identically distributed (i.i.d.) $\mathcal{CN}(0, \sigma_h^2)$, then $E\{|h_n|^2\} = \sigma_{h_n}^2$ and $E\{h_n h_m^*\}|_{n \neq m} = 0$. Thus $$\rho = \sum_{n=0}^{D} \sigma_{h_n}^2 e^{j2\pi \frac{n}{N}}. \quad (10)$$

For most practical values of $\mathcal{D}$ and $\sigma_h^2$, it can be assumed that $H_k \approx H_{k+1}$. Therefore, subcarriers k and k+1 can be written as $$r_k = H_k d_k + w_k \quad (11)$$

and $$r_{k+1} \approx H_k d_{k+1} + w_{k+1}. \quad (12)$$

At high SNRs, if $d_{k+1} \in \mathbb{R}^+$, which is the set of positive real numbers, then $$\arg\{r_{k+1}\} \approx \arg\{H_k\}. \quad (13)$$

By defining $\theta_k \triangleq \arg\{H_k\}$, then $\check{\theta}_k = \arg\{r_{k+1}\}$. Moreover, if $d_k$ belongs to a constant modulus (CM) constellation, then the knowledge of $\hat{\theta}_k$ is sufficient to compute $\check{d}_k$, where $$\check{d}_k = \underset{\check{d}_k}{\operatorname{argmin}} \left| e^{-j\check{\theta}_k} r_k - \check{d}_k \right|^2. \tag{14}$$

However, since $d_{k+1} \in \mathbb{R}^+$, the detector in (14) can be expressed as $$\check{d}_k = \underset{\check{d}_k}{\operatorname{argmin}} \left| r_{k+1}^H r_k - \check{d}_k \right|^2, k = [0, \ldots, N-1] \tag{15}$$

which is equivalent to the MRC in (6). Once $\check{d}_k$ is obtained, we can compute $\check{H}_k$ in a decision directed (DD) fashion, $$\check{H}_k = \frac{r_k}{\check{d}_k} = H_k + q_k \tag{16}$$

Figure 4:
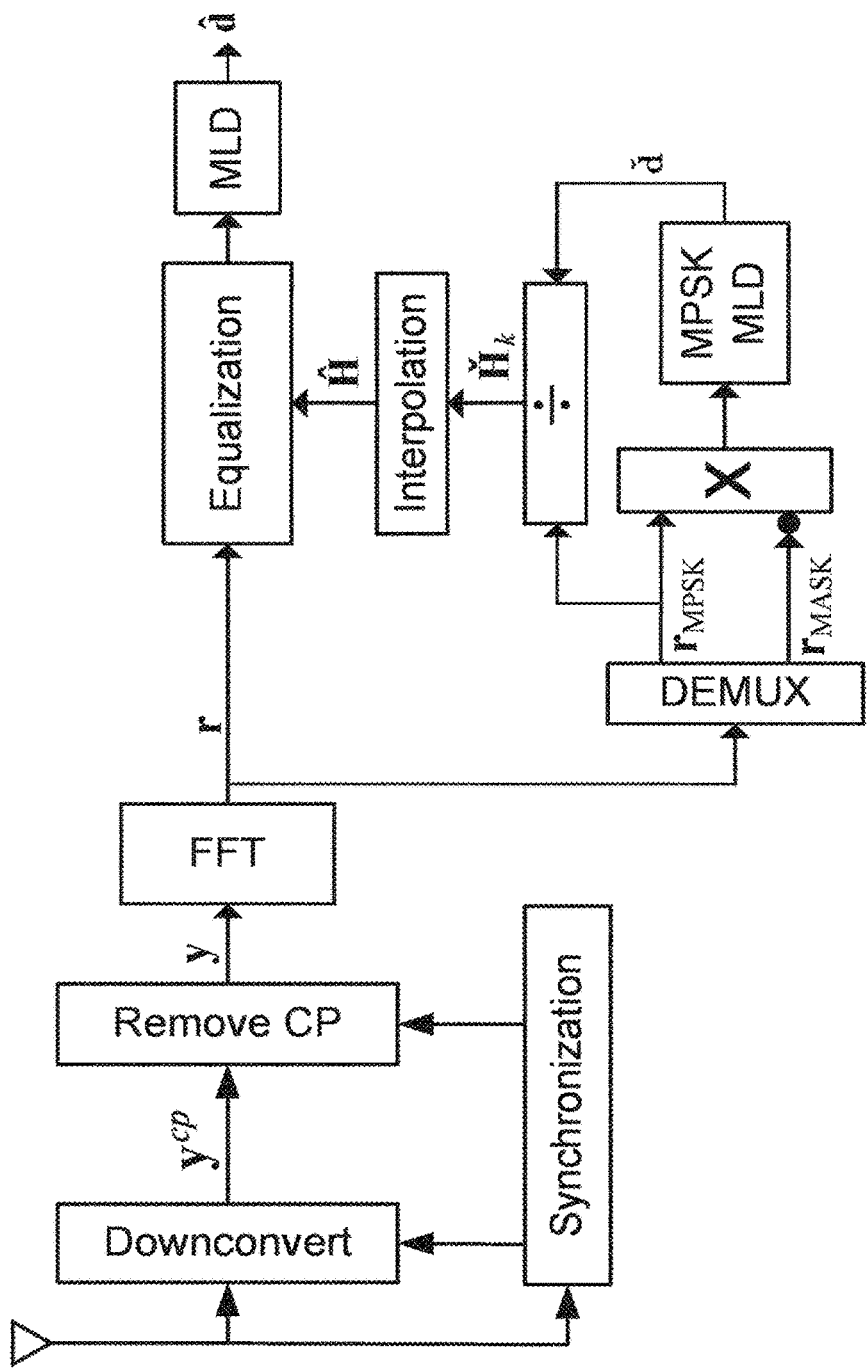
FIG. 4 illustrates a Block diagram of a one-shot blind channel estimator (OSBCE) using U=1 according to an embodiment of the invention.

Therefore, the proposed technique is based on replacing pilot symbols by data symbols that have CM, $d_k = e^{j\pi(2i+1)/M}$, $i \in \{0, 1, \ldots, M-1\}$, and using MASK to modulate the adjacent subcarrier, $d_{k+1} \in \mathbb{R}^+$. Finally, $H$ can be obtained from $\check{H}$ using any technique that is originally used in conjunction with pilot-aided systems [7], [16], [22]. A system level block diagram of the proposed channel estimator using $U=1$ is depicted in FIG. 4.

System Performance

Mean Squared Error (MSE)

The MSE of the initial CSI estimates in DD estimation can be expressed as, $$\mathrm{MSE}(\check{H}_k) = (\mathrm{MSE}|D_C)P_C + (\mathrm{MSE}|D_I)P_e \tag{17}$$

where the events of correct and incorrect decisions are denoted by $D_C$ and $D_I$, respectively, $P_c = \mathrm{Pr}(D_C) = \mathrm{Pr}(\check{d}=d_k)$ and $P_e = \mathrm{Pr}(D_I) = \mathrm{Pr}(\check{d}_k \neq d_k)$. The first part can be computed as $$\mathrm{MSE}|D_C = E\{|\check{H}_k|D_C - H_k|^2\}. \tag{18}$$

By noting that $$\check{H}_k \mid D_c = H_k \left| D_c + \frac{w_k \mid D_c}{\check{d}_k} \right.,$$

and using the approximation $$\check{H}_k \mid D_c \approx H_k + \frac{w_k}{d_k},$$

the MSE in (18) becomes $$\mathrm{MSE} \left| D_c \approx E\left\{ \frac{|w_k|^2}{|d_k|^2} \right\} \approx \frac{1}{\mathrm{SNR}} \right. \tag{19}$$

The result in (19) is expected because the process is similar to conventional LSE.

For the other case where $\check{d}_k \neq d_k$, the MSE can be obtained by noting that $$\check{H}_k \mid D_I = H_k \left| D_I \frac{d_k}{\check{d}_k} + \frac{w_k \mid D_I}{\check{d}_k} \right..$$

However, $$\check{H}_k \left| D_I \approx H_k \frac{d_k}{\check{d}_k} + \frac{w_k}{\check{d}_k} \right..$$

Thus $$\mathrm{MSE} \mid D_I \approx E\left\{ \left| H_k \frac{d_k}{\check{d}_k} + q_k - H_k \right|^2 \right\}. \tag{20}$$

where $$q_k = \frac{w_k}{\check{d}_k}.$$

By assuming that all transmitted symbols are equiprobable, and noting that the probability of error is identical for all transmitted symbols [24], we assume, without loss of generality, that $$d_k = e^{j\frac{\pi}{M}},$$

and hence, $$\check{d}_k \in e^{j\frac{\pi(2i+1)}{M}},$$

$i \in \{1, \ldots, M-1\}$. By defining $\varphi_k \triangleq \arg$ $$\left\{ \frac{d_k}{\check{d}_k} \right\} \in \left\{ \frac{-2\pi i}{M}, i = [1, \ldots M-1] \right\}$$

and substituting into (20), the $\mathrm{MSE}|D_I$ after some straightforward manipulations can be expressed as $$\mathrm{MSE} \mid D_I = 4(1 - 1E\{\cos(\varphi_k)\})\sigma_H^2 + \frac{1}{\mathrm{SNR}} \tag{21}$$

where $$E\{\cos(\varphi_k)|D_I\} = \sum_{i=1}^{M-1} \cos\left(\frac{-2\pi i}{M}\right) \mathrm{Pr}\left(\varphi_k = \frac{-2\pi i}{M} | D_I\right) \tag{22}$$

$$\mathrm{Pr}\left(\varphi_k = \frac{-2\pi i}{M}\right) = \int_{\frac{2\pi i}{M}}^{\frac{2\pi(i+1)}{M}} P_\Theta(\theta) d\theta \tag{23}$$

and $$\theta = \arg\{r_{k+1}^H r_k\} \tag{24}$$

To the best of our knowledge, there is no closed-form analytical or numerically efficient solution that can be used to compute Pr $$\left(\varphi_k = \frac{-2\pi i}{M}\right)$$

[24], [25]. Having said that, theoretical upper and lower bounds can be derived by noting that $-1 \leq \cos(\varphi_k) \leq 1$, and thus $$\frac{1}{SNR} \leq MSE \leq \frac{1}{SNR} + 8\sigma_H^2 P_e \quad (25)$$

Similar to the previous case, evaluating the exact value $P_e$ is computational prohibitive, particularly when considering the fact that $H_k \neq H_{k+1}$ and $E\{H_k H_{k+1}^*\} \neq 0$. Therefore, $P_e$ can be obtained using simulation to provide a semi-analytical solution.

Alternatively, we can use the following approximation of $P_e$ $$P_e \approx \frac{1}{\pi} \int_0^{\frac{\pi(M-1)}{M}} \left(1 + \Gamma \frac{\sin^2(\pi/M)}{\sin^2(\phi)}\right)^{-U} d\phi \quad (26)$$

which corresponds to the MRC of U independent and identically distributed signals over Rayleigh fading channels with perfect knowledge of CSI [23], $\Gamma$ denotes the average SNR per branch, which provides the following approximation for the MSE $$MSE \approx \frac{1}{SNR} + 8\sigma_H^2 P_e. \quad (27)$$

Spectral Efficiency

Spectral efficiency is one of the main motivations for researchers to develop blind channel estimation techniques, which is typically measured in bits/s/Hz, $W_{eff} = R_B/W$, where $R_B$ is the information bit rate and W is the required bandwidth. Comparison between different systems can be performed by computing relative spectral efficiency, which is the ratio of $W_{eff}^{(1)}/W_{eff}^{(2)}$, where the superscript is used to distinguish between the two considered systems. In OFDM systems with pilot symbols, bandwidth efficiency is typically computed as $$W_{eff} = \frac{N_B - N_{PB}}{N_B} \quad (28)$$

where $N_B$ is the total number of subcarriers per transmission block and $N_{PB}$ is the number of subcarriers allocated for pilot symbols in each block. In LTE, the transmission block can be considered equivalent to a resource block (RB) where $N_B = 12 \times 7$ and $N_{PB} = 4$, therefore $W_{eff}$ is about 95%. Although such efficiency is reasonable since the pilot symbols consume about 5% of the bandwidth, the situation can be much worse if the system requires inserting the pilots in time domain more frequently. For example, in particular systems such as fast frequency hopping (FFH) and cognitive radio, each OFDM symbol might be transmitted at different time slot, and hence, interpolation in time domain is not feasible. To overcome this problem, each OFDM symbol should be designed to include pilot symbols. Assuming that the pilots-subcarriers ratio is the same as in LTE RB first symbol, then $W_{eff}$ drops to 83%.

Since blind channel estimation techniques do not require pilot symbols, they are usually considered spectrally efficient and their spectral efficiency is 100%. Although such definition of spectral efficiency is widely used as reported in [12] and the references listed their in, it is actually valid only for the special case where all subcarriers are forced to have the same modulation type and order. However, in most modern communications system such as LTE, the modulation type and order do not have to be uniform across all subcarriers. Instead, the modulation type/order for each subcarrier can be changed adaptively to satisfy a certain objective function with predefined constraints. A common objective is to maximize the total number of transmitted bits under BER constrains [27]. Therefore, comparing two different systems in terms of relative spectral efficiency can be defined as $$\eta = \frac{E\left\{\max_{b_k} \sum_{k=1}^{N} b_k | \mathbb{S}_1\right\}}{E\left\{\max_{b_k} \sum_{k=1}^{N} b_k | \mathbb{S}_2\right\}} \times 100 \quad (29)$$

subject to:

$$\overline{P} = \frac{\sum_{k=1}^{N} (b_k | \mathbb{S}_i) P_k}{\sum_{k=1}^{N} b_k | \mathbb{S}_i} \leq P_T, \, i \in \{1, 2\}$$

where $\mathbb{S}$ is the set of constraints regarding the modulation type, modulation order and number of pilots, $\overline{P}$ is the average BER, $P_T$ is the BER threshold, $b_k | \mathbb{S}_1$ denotes the number of bits of the kth subcarrier of system $\mathbb{S}_i$, $P_k$ is the BER given $b_k$ and the instantaneous SNR at the kth subcarrier $\gamma_k$. If the kth subcarrier is reserved for pilot symbols, then $b_k = 0$. Consequently, the comparison between blind and non-blind systems is not obvious. For example, blind techniques with constant modulus symbols constraint [8]-[11] do not necessarily outperform pilot-based systems because QAM is more power efficient, and hence, the total number of bits may exceed that of blind estimators with constant modulus constraint. Section 2 presents numerical examples to compare the spectral efficiency for various systems.

Computational Complexity

To simplify the discussion, we consider the case with single receiving antenna, i.e., U=1. The channel estimates can be obtained using the following simple steps:

1. Compute $r_{k+1}^H r_k$: This step requires one complex multiplication, however it should not be considered as an additional complexity because it is equivalent to the equalization process, which is required anyway for recovering the information symbol at subcarrier k+1.
2. Compute $\hat{d}_k$ using (15): This step is not considered as excess complexity because it is required anyway to recover the information symbol.
3. Compute $\check{H}_k$ using (16): requires one complex division.
4. The set of initial channel estimates obtained at all k+1 values can be used to obtain the all the elements in H using interpolation [7], or any other technique [16].

Therefore, the proposed system complexity is equivalent to LSE, which is an evidence of the claimed low complexity.

Numerical Results

Monte Carlo simulations are used to evaluate the performance of the proposed one-shot blind channel estimation (OSBE) over static and time-varying frequency selective multipath fading channels. The performance of the proposed estimator is compared to the pilot based OFDM system with a pilot grid as shown in FIG. 1. The performance of the considered estimators is evaluated in terms of the MSE and BER.

The OFDM system considered in this paper follows the LTE downlink physical layer specifications [4] where the sampling frequency is 3.836 MHz, N=256 and $N_{cp}$=18 samples, the subcarrier spacing is 15 KHz, the total OFDM symbol period is 71.3 μsec, and the CP period is 4.69 μsec. All data symbols are QPSK modulated with symbol rate of 14 ksps except for the subcarriers adjacent to the pilot symbols, which are replaced by a unipolar 4-ASK. Two channel models are used which are the flat Rayleigh fading and the typical urban (Tux) multipath fading channel model [26] that consists of 9 taps with normalized delays of [0, 1, . . . , 8] and average gains of [0.269, 0.174, 0.289, 0.117, 0.023, 0.058, 0.036, 0.026, 0.008].

Figure 5:
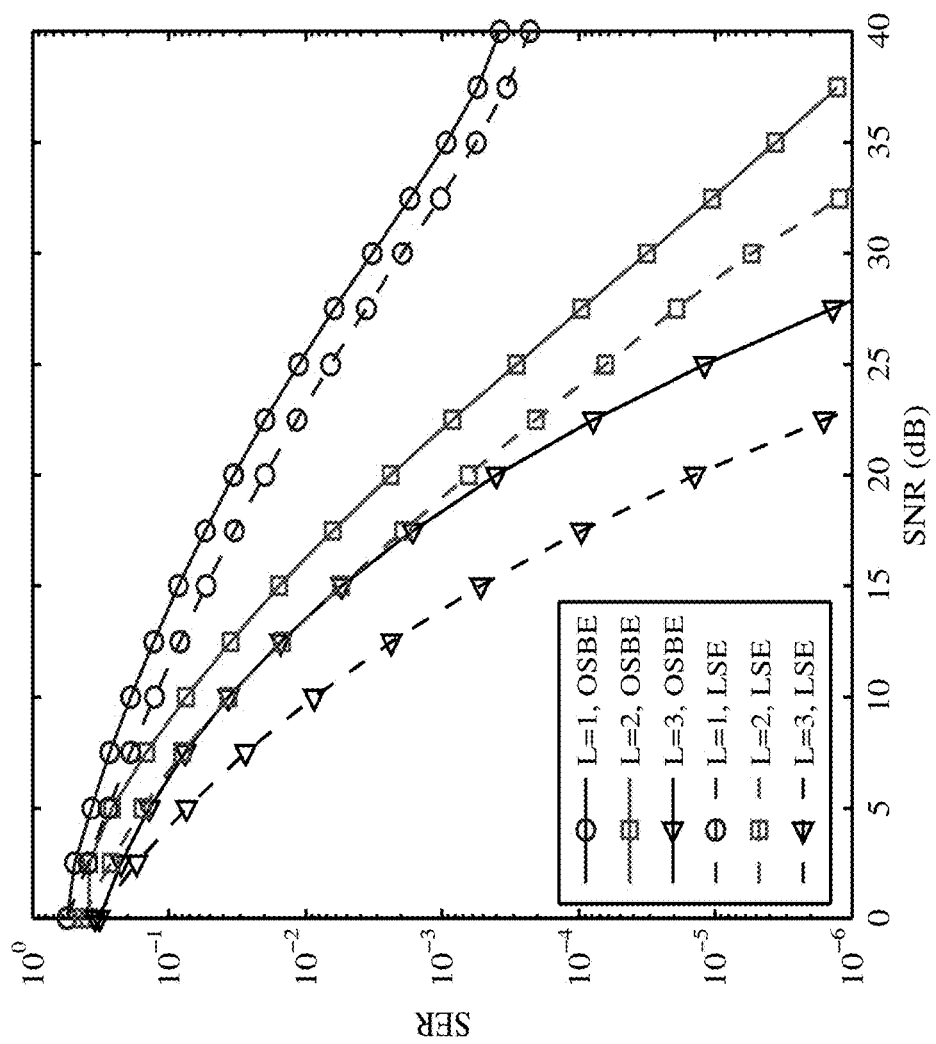
FIG. 5 illustrates an initial SER used for channel estimation compared with the SER using LSE over flat Rayleigh fading channels according to an embodiment of the invention.
Figure 6:
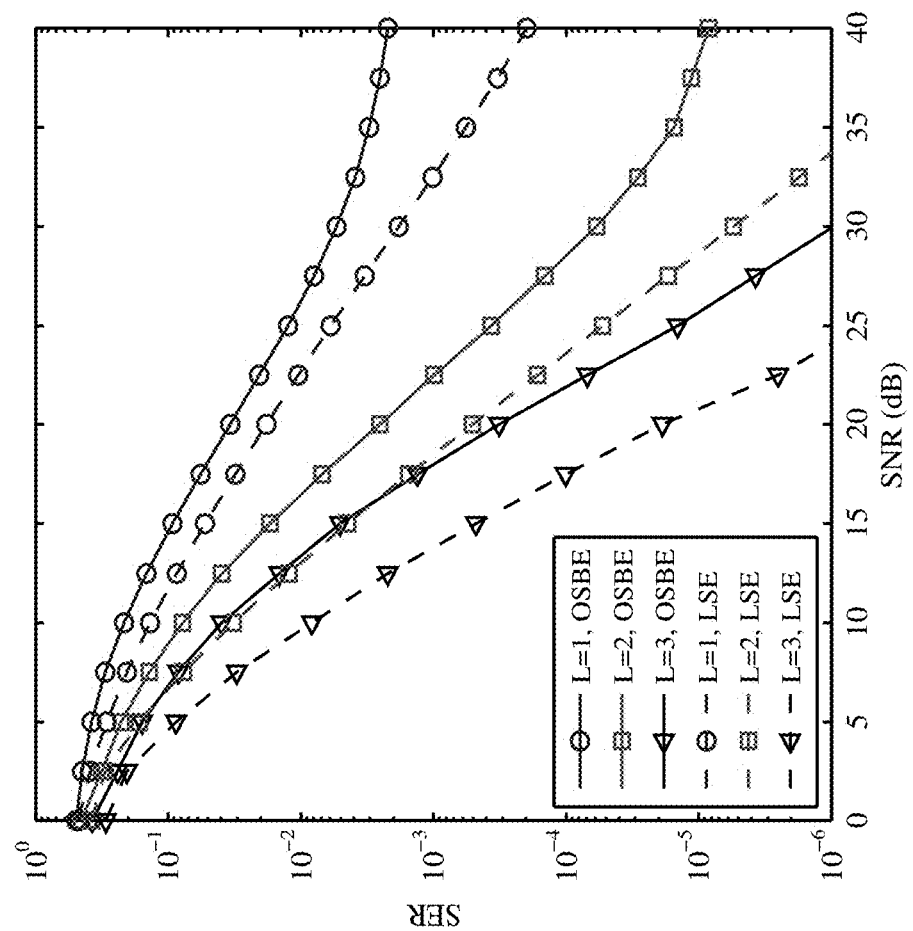
FIG. 6 illustrates an initial SER of the QPSK symbols obtained using a scheme according to an embodiment of the invention.

Simulation results of the initial SER, Pr ($\hat{d}_k \neq d_k$) of the symbols detected using (15) is depicted in FIGS. 5 and 6 using flat and tie frequency-selective Tux channel for different values of U. The LSE results are obtained using (8), and hence, the channel estimates are affected only by AWGN. As it can be noted from the results, the proposed estimation algorithm can provide reliable SER that can be used for channel estimation. Generally speaking, the LSE-SER outperforms the proposed scheme by about 4 to 6 dB at low and medium SNRs. In the Tux channel, the difference at high SNRs becomes higher due to the error floor exhibited by the proposed system at high SNRs. Such error floor is introduced because E{arg {$H_k$}}≠E{arg {$H_{k+1}$}}, and hence, the multiplication process of $r_k r_{k+1}^H$ is equivalent to equalization with biased channel estimates. However, since such floors appear at high SNRs, the SER will be low enough to produce reliable channel estimates, which can be filtered later by the interpolation process, or by other techniques [16]. FIG. 5 is similar to FIG. 6 except that the channel is flat. As it can be noted from the figure, the error floors disappeared because $H_k = H_{k+1}$ in flat fading. However, a fixed difference can still be observed because the small amplitudes in the MASK symbols will produce higher SER as compared to the high amplitudes.

Figure 7:
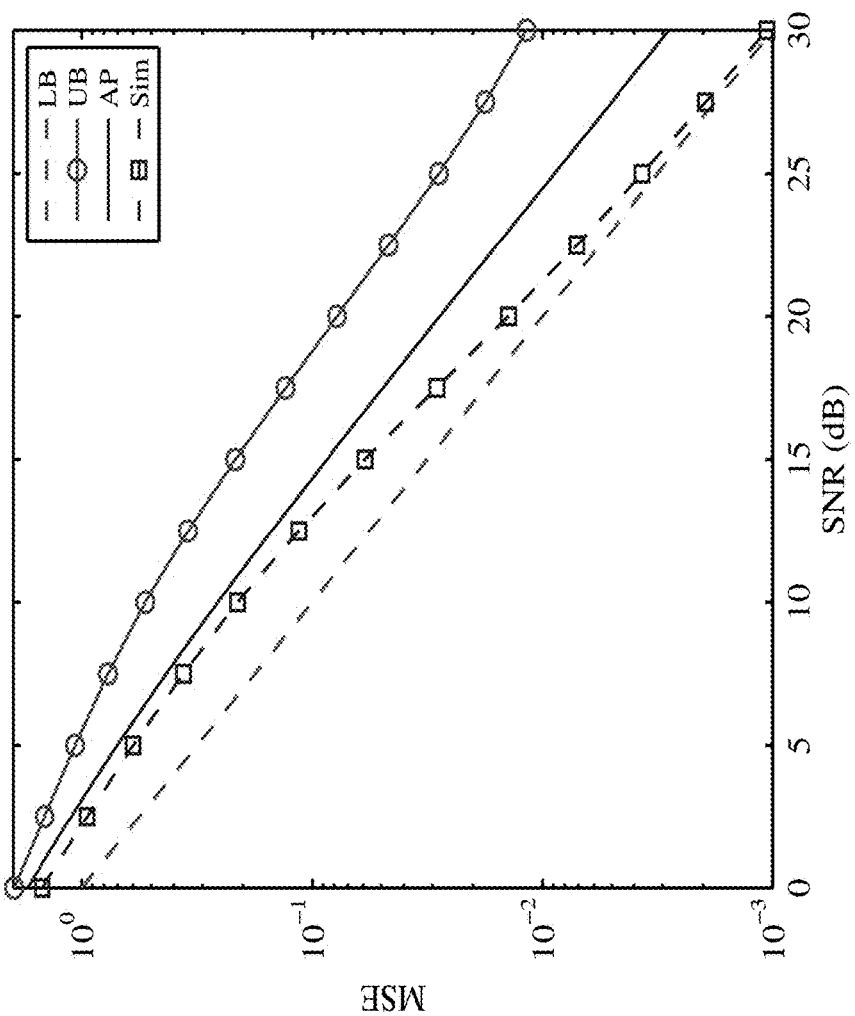
FIG. 7 illustrates an initial MSE of a proposed technique for U=1, before interpolation, according to an embodiment of the invention.
Figure 8:
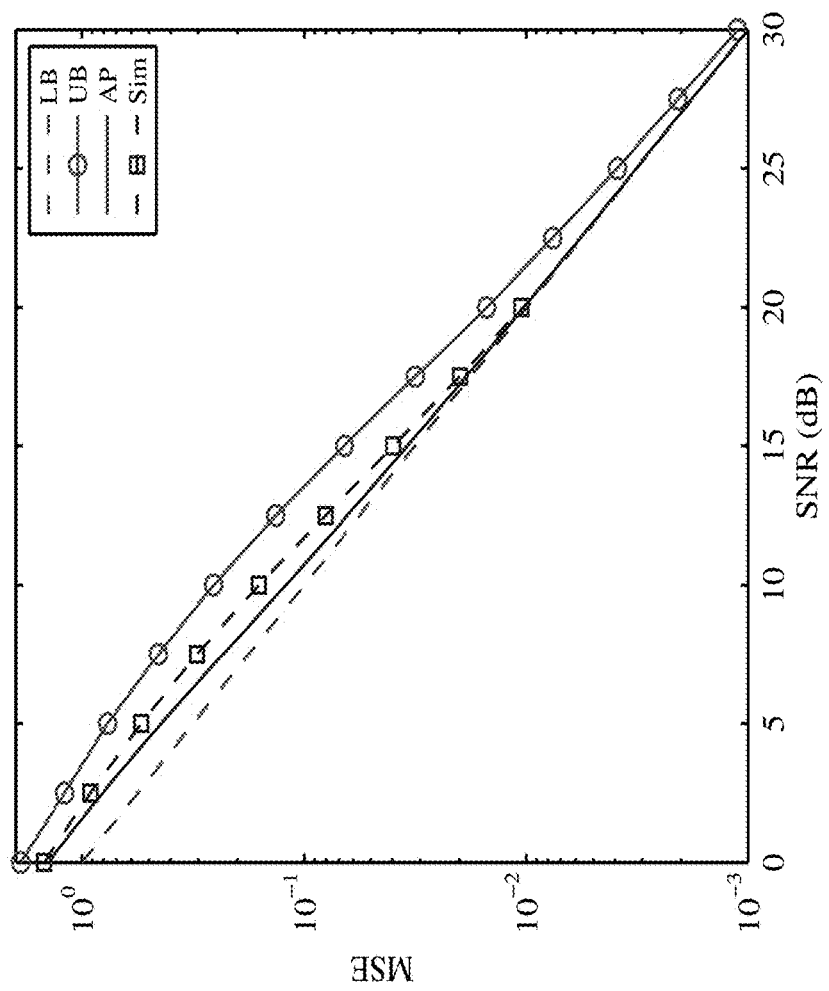
FIG. 8 illustrates an initial MSE of a proposed technique for U=2, before interpolation, according to an embodiment of the invention
Figure 9:
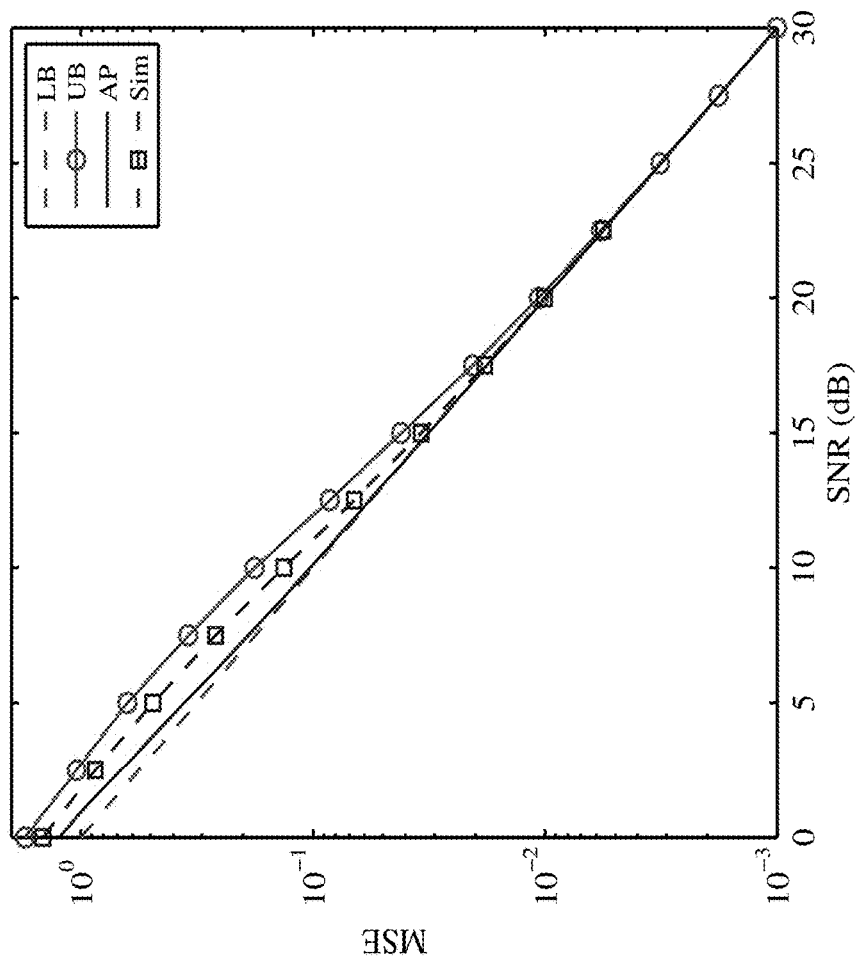
FIG. 9 illustrates an initial MSE of a proposed technique for U=3, before interpolation, according to an embodiment of the invention.

The MSE for U=1, 2, 3 is presented in FIGS. 7-9, respectively. It can be noted that the proposed algorithm can produce reliable channel estimates, which are comparable to the LSE, particularly at moderate and high SNRs, and for U≥2. For U=1, the upper bound and approximation accuracy is relatively poor because $P_e$ and the inverse of the SNR in (25) are comparable, and hence, setting E {cos ($\varphi_k$)}=1 becomes too pessimistic. For U≥2, $P_e \ll 1/\text{SNR}$ and hence the upper bound becomes tighter and the approximation more accurate. It is also worth noting that the MSE may diverge from the lower bound at high SNRs because $P_e$ suffers from error floors at high SNRs. Nevertheless, such behavior should not be a concern because it happens only at high SNRs where the obtained channel estimates are accurate enough to be used in the subsequent steps.

Figure 10:
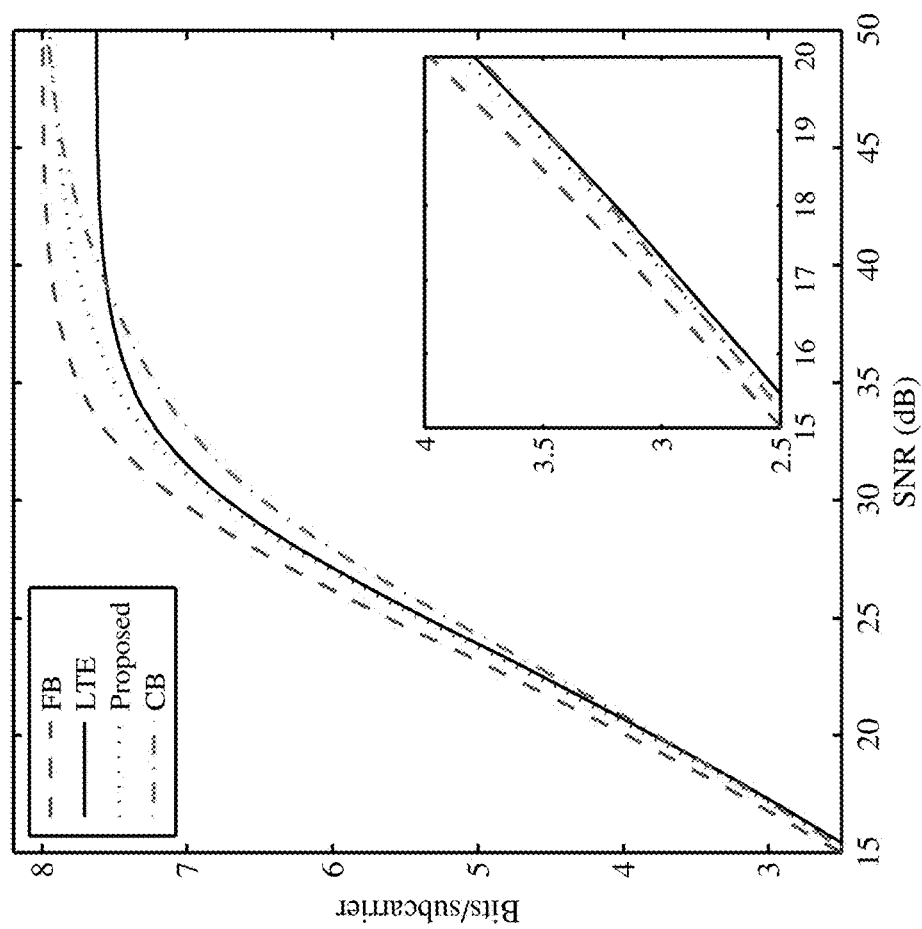
FIG. 10 illustrates a average number of bits per subcarrier for $P_B=10^{-3}$ an OFDM system according to an embodiment of the invention.

The spectral efficiency of the proposed system is compared to the fully blind (FB) OFDM where the modulation order M per subcarrier can be changed between 1 and 256 assuming QAM modulation. The appropriate modulation order is selected such that the average BER is less than $10^{-3}$. The modulation orders for all subcarriers are computed using the Incremental Allocation Algorithm proposed in [27]. If the SNR for a particular subcarrier does not satisfy the BER threshold, that subcarrier is nulled by setting M=1. The same results are presented for conditionally blind channel (CB) estimators. The widely adopted constant modulus constraint is considered, and hence, all subcarriers can be modulated only using MPSK. The proposed system is also CB where the pilot symbols are replaced by MASK symbols and the neighbor subcarrier should have constant modulus constellation such as MPSK. For fair comparison, we assume that OFDM symbols that do not have originally pilots can be modulated using QAM. As it can be noted from FIG. 10, which shows the average number of bits per subcarrier, the FB system outperforms all other systems since it does not have pilots and it is not limited by the modulation type. The proposed system consistently outperforms the CB-PSK system because 8 out of the 12 subcarriers in each RB can be modulated using QAM. Surprisingly, LTE outperforms CB-PSK systems for a wide rang of SNR. Therefore, sacrificing a few subcarriers as pilots and selecting the modulation type for other subcarriers freely is better than forcing all subcarriers to have PSK modulation.

Figure 11:
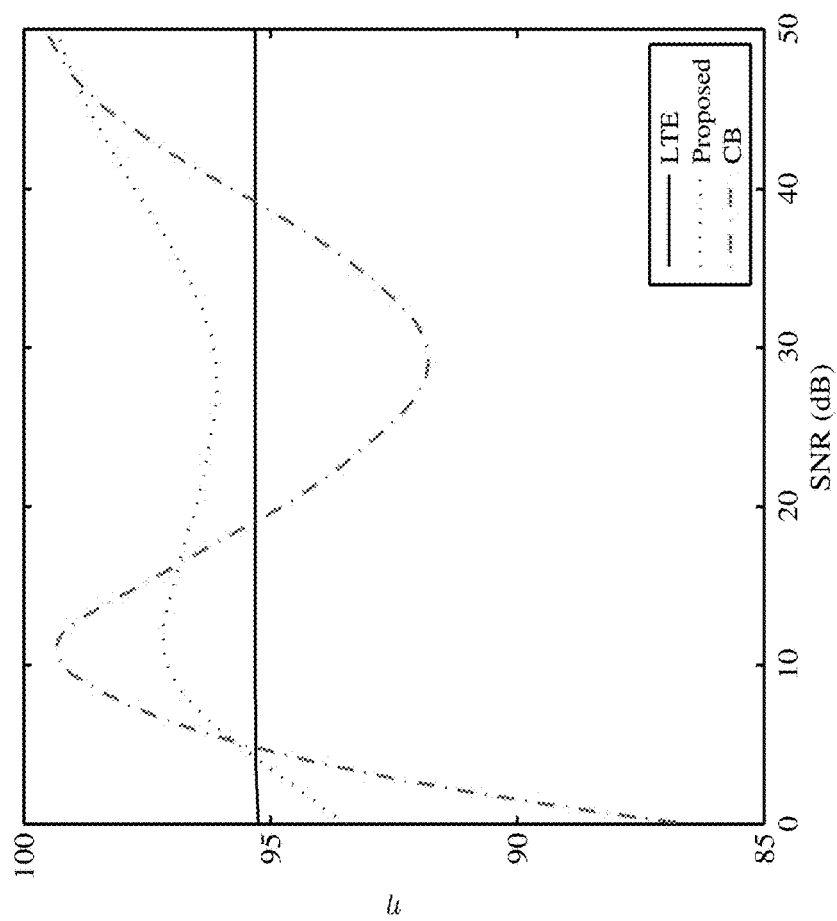
FIG. 11 illustrates a relative spectral efficiency of an OFDM system as compared to LTE and conditionally blind systems according to an embodiment of the invention.

The relative spectral efficiency η of the proposed, FB and CB systems is presented in FIG. 11. The reference system is a fully loaded OFDM system with no pilots, and QAM modulation is used where 1≤M≤256. In the range of SNR∈ [0, 50] dB, the figure shows some interesting results where LTE outperforms CB estimators for SNR≤4.8 dB and for 19≤SNR≤39 dB. LTE also outperforms the proposed estimator, but only for SNR≤4 dB. Such performance is obtained because MASK, MPSK and QAM have different power efficiencies. Therefore, at certain SNRs, the number of bits gained by using QAM in most subcarriers is larger than the number of bits lost by using pilots. At SNR of 47 dB, the modulation order becomes 256 for the MPSK and QAM, but not for the MASK. Therefore, the CB slightly outperforms the proposed system.

CONCLUSION

In this work, a novel blind channel estimator based using a hybrid OFDM symbol structure where certain subcarriers are modulated by MASK and the adjacent subcarrier is modulated using MPSK. Therefore, the MASK can be considered as the channel frequency response with respect to the MPSK symbol, and hence, the MPSK symbol can be immediately detected. Then, the detected MPSK symbol is used to estimate the channel in a DD manner Monte Carlo simulation results showed that the proposed system can produce accurate channel estimation which is comparable to LSE and for the same complexity. The concept of spectral efficiency of blind estimation is also revisited where we proposed an accurate and fair metric to compare the spectral efficiency of blind and non-blind channel estimators. The obtained results showed that imposing constraints on the modulation type may compromise the system spectral efficiency at certain SNRs, which contradicts the common belief that blind techniques are the most spectrally efficient by default.

REFERENCES

1. E. Dahlman, S. Parkvall and J. Skold, 4G: LTE/LTE-Advanced for Mobile Broadband, Academic Press, 2nd Edition, London, U K, 2013.

2. EN 302 755 V1.2.1 (2011-02). Digital Video Broadcasting (DVB); Frame structure channel coding and modulation for a second generation digital terrestrial television broadcasting system (DVB-T2), European Standard ETSI, 2011.
3. IEEE Standard for Wireless MAN-Advanced Air Interface for Broadband Wireless Access Systems, IEEE 802.16.1-2012 Std., September 2012.
4. LTE, Evolved Universal Terrestrial Radio Access (E-UTRA), LTE physical layer, General description (3GPP TS 36.201 version 11.0.0 Release 11).
5. IEEE Standard for Broadband over Power Line Networks: Medium Access Control and Physical Layer Specifications, IEEE Standard 1901, 2010.
6. H. Lin, "Flexible Configured OFDM for 5G Air Interface," IEEE Access, vol. 3, pp. 1861-1870, September 2015.
7. X. Dong, W. Lu and A. Soong, "Linear interpolation in pilot symbol assisted channel estimation for OFDM," IEEE Transactions on Wireless Communications, vol. 6, no. 5, pp. 1910-1920, May 2007.
8. C. Tu and B. Champagne, "Subspace-based blind channel estimation for MIMO-OFDM systems with reduced time averaging," IEEE Transactions on Vehicular Technology, vol. 59, no. 3, pp. 1539-1544, March 2010.
9. F. Gao, Y. Zeng, A. Nallanathan, and T. S. Ng, "Robust subspace blind channel estimation for cyclic prefixed MIMO OFDM systems," IEEE Journal on Selected Areas in Communications, vol. 26, no. 2, pp. 378-388, February 2008.
10. M. C. Necker and G. L. Stüber, "Totally blind channel estimation for OFDM on fast varying mobile radio channels," IEEE Transactions on Wireless Communications, vol. 3, no. 5, pp. 1514-1525, September 2004.
11. F. Gao and A. Nallanathan, "Blind channel estimation for MIMO OFDM systems via nonredundant linear precoding," IEEE Transactions on Signal Processing, vol. 55, no. 2, pp. 784-789, February 2007.
12. T. Al-Naffouri, A. Dahman, M. Sohail, W. Xu and B. Hassibi, "Low-complexity blind equalization for OFDM systems with general constellations," IEEE Transactions on Signal Processing, vol. 60, no. 12, pp. 6395-6407, December 2012.
13. S. Banani and R. Vaughan, "OFDM with iterative blind channel estimation," IEEE Transactions on Vehicular Technology, vol. 59, no. 9, November 2010.
14. S. Park, B. Shim and J. Choi, "Iterative channel estimation using virtual pilot signals for MIMO-OFDM systems," IEEE Transactions on Signal Processing, vol. 63, no. 12, pp. 3032-3045, Jun. 15, 2015.
15. M. Song, D. Kim and G. Im, "Recursive channel estimation method for OFDM-based cooperative systems," IEEE Communications Letters, vol. 14, no. 11, pp. 1029-1031, November 2010.
16. S. Liu, F. Wang, R. Zhang and Y. Liu, "A simplified parametric channel estimation scheme for OFDM systems," IEEE Transactions on Wireless Communications, vol. 7, no. 12, pp. 5082-5090, December 2008.
17. O. Edfors, M. Sandell, and J.-J. van de Beek, "OFDM channel estimation by singular value decomposition," IEEE Transactions on Communications, vol. 46, no. 7, pp. 931-939, July 1998.
18. T. Ma, Y. Shi and Y. Wang, "A low complexity MMSE for OFDM systems over frequency-selective fading channels," IEEE Communications Letters, vol. 16, no. 3, pp. 304-306, March 2012.
19. A. Al-Dweik, A. Hazmi, S. Younis, B. Sharif, and C. Tsimenidis, "Carrier frequency offset estimation for OFDM systems over mobile Radio channels", IEEE Transactions on Vehicular Technology, vol. 59, pp. 974-979, February 2010.
20. M. Mirhamdi, A. Al-Dweik and A. Shami, "BER reduction of OFDM based broadband communication systems over multipath channels with impulsive noise," IEEE Transactions on Communications, vol. 61, no. 11, pp. 4602-4615, November 2013.
21. H. Meyr, M. Moeneclaey, and S. Fechteligital, Communication Receivers, vol. 2: Synchronization, Channel Estimation, and Signal Processing, Wiley and Sons, N Y, 1998.
22. M. Chang, "A new derivation of least-squares-fitting principle for OFDM channel estimation," IEEE Transactions on Wireless Communications, vol. 5, no. 4, pp. 726-731, April 2006.
23. M. Simon and M. Alouini, Digital Communication over Fading Channels—A Unified Approach to Performance Analysis, 2nd Ed., Wiley, 2005.
24. R. Mallik and N. Sagias, "Distribution of inner product of complex Gaussian random vectors and its applications", IEEE Transactions on Communications, vol. 59, no. 12, pp. 3353-3362, December 2011.
25. N. O'Donoughue and J. Moura, "On the product of independent complex Gaussians," IEEE Transactions on Signal Processing, vol. 60, no. 3, pp. 1050-1063, March 2012.
26. ETSI TR 125 943 V9.0.0 (2010-02), Universal Mobile Telecommunications System (UMTS) Deployment Aspects, 3GPP TR 25.943 version 9.0.0 Release 9.
27. A. Wyglinski, F. Labeau, and P. Kabal. "Bit loading with BER-constraint for multicarrier systems." IEEE Transactions on Wireless Communications, vol. 4, no. 4, pp. 1383-1387, July 2005.

The invention claimed is:
1. A channel estimation device in an Orthogonal Frequency Division Multiplexing (OFDM) system comprising an OFDM transmitter and an OFDM receiver adapted to communicate data symbols over a communication channel having channel conditions, the channel estimation device being adapted to:
at the OFDM transmitter side, modulate the OFDM subcarriers by data symbols in a frequency domain using different modulation techniques for generating modulated data symbols having a diversified symbol type configuration, the different modulation techniques comprising a first modulation technique, a second modulation technique and a third modulation technique, the modulated data symbols having the diversified symbol type configuration being generated by modulating first OFDM subcarriers using the first modulation technique for generating first type symbols, modulating second OFDM subcarriers adjacent the first OFDM subcarriers in the frequency domain using the second modulation technique for generating second type symbols and modulating third OFDM subcarriers using the third modulation technique for generating third type symbols; and
at the OFDM receiver side, consider the first type symbols as first channel responses and to process said first channel responses for detecting the second type symbols and to consider the second type symbols as second channel responses and to process said first and second channel responses for detecting the third type symbols, wherein the first, second and third type symbols used by the channel estimation device are data-bearing symbols only and are free of pilot symbols.

2. The channel estimation device as claimed in claim 1, wherein the different modulation techniques comprise MPSK, MASK and QAM.

3. The channel estimation device as claimed in claim 2, wherein the first modulation technique is MASK, the second modulation technique is MPSK and the third modulation technique is QAM.

4. The channel estimation device as claimed in claim 1, wherein the data symbols are modulated to form a plurality of symbol blocks and wherein each symbol block among said plurality of symbol blocks is generated according to the diversified symbol type configuration.

5. The channel estimation device as claimed in claim 4, wherein each symbol block comprises at least two pairs of adjacently formed first and second type symbols such that each pair of adjacently formed first and second type symbols is separated from another pair of adjacently formed first and second type symbols by a frequency spacing using third type symbols.

6. The channel estimation device as claimed in claim 5, wherein the channel estimation device is adapted to adjust the frequency spacing as a function of the channel conditions.

7. The channel estimation device as claimed in claim 4, wherein the symbol blocks are separated between each other by a time spacing using third type symbols.

8. The channel estimation device as claimed in claim 7, wherein the channel estimation device is adapted to adjust the time spacing as a function of the channel conditions.

9. The channel estimation device as claimed in claim 1, wherein the OFDM system is a Long Term Evolution LTE-Advanced (LTE-A) system.

10. The channel estimation device as claimed in claim 1, wherein the communication channel is a fading channel.

11. The channel estimation device as claimed in claim 1, wherein said device performs channel estimation in a Decision-Directed (DD) manner.

12. An Orthogonal Frequency Division Multiplexing (OFDM) system for broadband communication of data symbols over a communication channel having channel conditions, the OFDM system comprising:
   an OFDM transmitter adapted to modulate the data symbols by OFDM subcarriers in a frequency domain using different modulation techniques for generating modulated data symbols having a diversified symbol type configuration, the different modulation techniques comprising a first modulation technique, a second modulation technique and a third modulation technique, the modulated data symbols having the diversified symbol type configuration being generated by modulating first OFDM subcarriers using the first modulation technique for generating first type symbols, modulating second OFDM subcarriers adjacent the first OFDM subcarriers in the frequency domain using the second modulation technique for generating second type symbols and modulating third OFDM subcarriers using the third modulation technique for generating third type symbols; and
   an OFDM receiver adapted to process the first type symbols as first channel responses and to process said first channel responses for detecting the second type symbols and to process the second type symbols as second channel responses and to process said first and second channel responses for detecting the third type symbols,
wherein the first, second and third type symbols used by the channel estimation device are data-bearing symbols only and are free of pilot symbols.

13. The OFDM system as claimed in claim 12, wherein the different modulation techniques comprise MPSK, MASK and QAM, and wherein the first modulation technique is MASK, the second modulation technique is MPSK and the third modulation technique is QAM.

14. The OFDM system as claimed in claim 13, wherein the data symbols are modulated to form a plurality of symbol blocks and wherein each symbol block among said plurality of symbol blocks is generated according to the diversified symbol type configuration, and wherein each symbol block comprises at least two pairs of adjacently formed first and second type symbols such that each pair of adjacently formed first and second type symbols is separated from another pair of adjacently formed first and second type symbols by a frequency spacing using third type symbols and wherein the symbol blocks are separated between each other by a time spacing using third type symbols.

15. The OFDM system as claimed in claim 14 adapted to adjust the frequency spacing and the time spacing as a function of the channel conditions.

16. The OFDM system as claimed in claim 15, wherein the OFDM system uses a Long Term Evolution LTE-Advanced (LTE-A) system, the communication channel is a fading channel, and the OFDM receiver uses a Mean Squared Error (MSE) estimation in Decision-Directed (DD) manner.

17. The OFDM system as claimed in claim 16, wherein the OFDM system has equal complexity in comparison to an equivalent system using pilots for channel estimation, with a better bit error rate (BER) performance.

\* \* \* \* \*